(12) United States Patent
Norden et al.

(10) Patent No.: US 8,392,644 B2
(45) Date of Patent: Mar. 5, 2013

(54) SYSTEM AND METHOD FOR AUTOMATIC HARDWARE INTERRUPT HANDLING

(75) Inventors: Erik K. Norden, Munich (DE); David Yiu-Man Lau, San Jose, CA (US); James H. Robinson, New York, NY (US)

(73) Assignee: MIPS Technologies, Inc., Sunnyvale, CA (US)

( * ) Notice: Subject to any disclaimer, the term of this patent is extended or adjusted under 35 U.S.C. 154(b) by 303 days.

(21) Appl. No.: 12/847,772

(22) Filed: Jul. 30, 2010

(65) Prior Publication Data

US 2012/0030392 A1  Feb. 2, 2012

(51) Int. Cl.
*G06F 9/48* (2006.01)
(52) U.S. Cl. .................. 710/269; 710/260; 712/244
(58) Field of Classification Search ............. 710/260, 710/268, 269; 712/244
See application file for complete search history.

(56) References Cited

U.S. PATENT DOCUMENTS

| | | | |
|---|---|---|---|
| 4,764,869 A * | 8/1988 | Miyazaki et al. | 712/228 |
| 5,644,772 A * | 7/1997 | Mann | 710/260 |
| 7,925,864 B2 * | 4/2011 | Uhler | 712/200 |
| 2010/0036987 A1* | 2/2010 | Streett et al. | 710/269 |
| 2010/0262805 A1* | 10/2010 | Justice et al. | 712/37 |

* cited by examiner

*Primary Examiner* — Glenn A Auve
(74) *Attorney, Agent, or Firm* — Sterne, Kessler, Goldstein & Fox P.L.L.C.

(57) ABSTRACT

A processing system is provided consisting of an interrupt pin, multiple registers, a stack pointer, and an automatic interrupt system. The multiple registers store a number of processor states values. When the system detects an interrupt on the interrupt pin the system prepares to enter an exception mode where the automatic interrupt system causes an interrupt vector to be fetched, the stack pointer to be updated, and the processor state values to be read in parallel from the registers and stored in memory locations based on the updated stack pointer, prior to the execution of an interrupt service routine. A method for automatic hardware interrupt handling is also presented.

18 Claims, 89 Drawing Sheets

Example Format of IntCtl COP0 Register

| 31 29 | 28 26 | 25 23 | 22 | 21 | 20 16 | 15 | 14 | 13 10 | 9 5 | 4 0 |
|---|---|---|---|---|---|---|---|---|---|---|
| IPTI | IPPCI | IPFDC | PF | ICE | StkDec | Clr-EXL | APE | Use KStk | VS | 0 |
| | | | | | | | | 000 | | 0 |

| Fields | | Description | Read/Write | Reset State | Compliance |
|---|---|---|---|---|---|
| Name | Bits | | | | |
| IPTI | 31..29 | For Interrupt Compatibility and Vectored Interrupt modes, this field specifies the IP number to which the Timer Interrupt request is merged, and allows software to determine whether to consider *Cause* TI for a potential interrupt.<br><br>| Encoding | IP bit | Hardware Interrupt Source |<br>|---|---|---|<br>| 2 | 2 | HW0 |<br>| 3 | 3 | HW1 |<br>| 4 | 4 | HW2 |<br>| 5 | 5 | HW3 |<br>| 6 | 6 | HW4 |<br>| 7 | 7 | HW5 |<br><br>The value of this field is UNPREDICTABLE if External Interrupt Controller Mode is both implemented and enabled. The external interrupt controller is expected to provide this information for that interrupt mode. | R | Preset or Externally Set | Required |

| Fields | | Description | Read/ Write | Reset State | Compliance |
|---|---|---|---|---|---|
| Name | Bits | | | | |
| IPPCI | 28..26 | For Interrupt Compatibility and Vectored Interrupt modes, this field specifies the IP number to which the Performance Counter Interrupt request is merged, and allows software to determine whether to consider $Cause_{PCI}$ for a potential interrupt.<br><br>| Encoding | IP bit | Hardware Interrupt Source |<br>|---|---|---|<br>| 2 | 2 | HW0 |<br>| 3 | 3 | HW1 |<br>| 4 | 4 | HW2 |<br>| 5 | 5 | HW3 |<br>| 6 | 6 | HW4 |<br>| 7 | 7 | HW5 |<br><br>The value of this field is UNPREDICTABLE if External Interrupt Controller Mode is both implemented and enabled. The external interrupt controller is expected to provide this information for that interrupt mode. If performance counters are not implemented ($Config1_{PC=0}$), this field returns zero on read. | R | Preset or Externally Set | Optional (Performance Counters Implemented) |

| Fields | | Description | Read/Write | Reset State | Compliance |
|---|---|---|---|---|---|
| Name | Bits | | | | |
| IPFDC | 25..23 | For Interrupt Compatibility and Vectored Interrupt modes, this field specifies the IP number to which the Fast DebugChannel Interrupt request is merged, and allows software to determine whether to consider Cause$_{FDC}$ for a potential interrupt.<br><br>| Encoding | IP bit | Hardware Interrupt |<br>|---|---|---|<br>| 2 | 2 | HW0 |<br>| 3 | 3 | HW1 |<br>| 4 | 4 | HW2 |<br>| 5 | 5 | HW3 |<br>| 6 | 6 | HW4 |<br>| 7 | 7 | HW5 |<br><br>The value of this field is UNPREDICTABLE if External Interrupt Controller Mode is both implemented and enabled. The external interrupt controller is expected to provide this information for that interrupt mode. If EJTAG FDCis not implemented, this field returns zero on read. | R | Preset or Externally Set | Optional (EJTAG Fast Debug Channel Implemented) |

| Fields | | Description | Read/Write | Reset State | Compliance |
|---|---|---|---|---|---|
| Name | Bits | | | | |
| PF | 22 | Enables Vector Prefetching Feature.<br><br>\| Encoding \| Meaning \|<br>\|---\|---\|<br>\| 0 \| Vector Prefetching disabled. \|<br>\| 1 \| Vector Prefetching enabled. \| | RW | 0 | Required if MCU ASE is implemented. |

| Fields | | Description | Read/Write | Reset State | Compliance |
|---|---|---|---|---|---|
| Name | Bits | | | | |
| ICE | 21 | For IRET instruction. Enables Interrupt Chaining.<br><br>| Encoding | Meaning |<br>\|---\|---\|<br>\| 0 \| Interrupt Chaining disabled. \|<br>\| 1 \| Interrupt Chaining enabled. \| | RW | 0 | Required if MCU ASE is implemented. |

| Fields | | Description | Read/ Write | Reset State | Compliance |
|---|---|---|---|---|---|
| Name | Bits | | | | |
| StkDec | 20..16 | For Auto-Prologue feature. This is the number of 4-byte words that are decremented from the value of GPR29. <table><tr><td>Encoding</td><td>Decrement Amount in Words</td><td>Dsecrement Amount in Bytes</td></tr><tr><td>0-3</td><td>3</td><td>12</td></tr><tr><td>Others</td><td>As encoded, e.g., 0x5 means 5 words</td><td>4* encoded value e.g., 0x5 means 20 bytes</td></tr></table> | RW | 0x3 | Required if MCU ASE is implemented. |

| Fields | | Description | Read/Write | Reset State | Compliance |
|---|---|---|---|---|---|
| Name | Bits | | | | |
| ClrEXL | 15 | For Auto-Prologue feature and IRET instruction. If set, during Auto-Prologue and IRET interrupt chaining, the KSU/ERL/EXL fields are cleared.<br><br>| Encoding | Meaning |<br>\|---\|---\|<br>\| 0 \| Fields are not cleared by these operations. \|<br>\| 1 \| Fields are cleared by these operations. \| | RW | 0 | Required if MCU ASE is implemented. |

| Fields | | Description | Read/Write | Reset State | Compliance |
|---|---|---|---|---|---|
| Name | Bits | | | | |
| APE | 14 | Enables Auto-Prologue feature.<br><br>| Encoding | Meaning |<br>\|---\|---\|<br>\| 0 \| Auto-Prologue disabled. \|<br>\| 1 \| Auto-Prologue enabled. \| | RW | 0 | Required if MCU ASE is implemented. |

| Fields | | Description | Read/Write | Reset State | Compliance |
|---|---|---|---|---|---|
| Name | Bits | | | | |
| UseKStk | 13 | Chooses which Stack to use during Interrupt Automated Prologue.<br><br>| Encoding | Meaning |<br>|---|---|<br>| 0 | Copy $29 of the Previous SRS to the Current SRS at the beginning of IAP. This is used for Bare-Iron environments with only one stack. |<br>| 1 | Use $29 of the Current SRS at the beginning of IAP. This is used for environments where there are separate User-mode and Kernel mode stacks. In this case, $29 of the SRS used during IAP must be pre-initialized by software to hold the Kernel mode stack pointer. | | RW | 0 | Required if MCU ASE is implemented. |

| Fields | | Description | Read/ Write | Reset State | Compliance |
|---|---|---|---|---|---|
| Name | Bits | | | | |
| 0 | 13..10 | Must be written as zero; returns zero on read. | 0 | 0 | Reserved |

| Fields | | Description | Read/Write | Reset State | Compliance |
|---|---|---|---|---|---|
| Name | Bits | | | | |
| VS | 9..5 | Vector Spacing. If vectored interrupts are implemented (as denoted by $Config3_{VInt}$ or $Config3_{VEIC}$), this field specifies the spacing between vectored interrupts.<br><br>| Encoding | Spacing Between Vectors |<br>\|---\|---\|<br>\| | (hex) (decimal) \|<br>\| 0x00 | 0x000 0 \|<br>\| 0x01 | 0x020 32 \|<br>\| 0x02 | 0x040 64 \|<br>\| 0x04 | 0x080 128 \|<br>\| 0x08 | 0x100 256 \|<br>\| 0x10 | 0x200 512 \|<br><br>All other values are reserved. The operation of the processor is UNDEFINED if a reserved value is written to this field. If neith EIC interrrupt mode nor VI mode are implemented ($Config3_{VEIC}$=0 and $Config3_{VINT}$=0), this field is ignored on write and reads as zero. | R/W | 0 | Optional |

FIG. 3K

| Fields | | Description | Read/Write | Reset State | Compliance |
|---|---|---|---|---|---|
| Name | Bits | | | | |
| 0 | 4..0 | Must be written as zero; returns zero on read. | 0 | 0 | Reserved |

Example Format of Status COP0 Register

400

| 31 | 28 | 27 | 26 | 25 | 24 | 23 | 22 | 21 | 20 | 19 | 18 | 17 16 | 15 | 10 9 | 8 7 5 | 4 | 3 | 2 | 1 | 0 |
|---|---|---|---|---|---|---|---|---|---|---|---|---|---|---|---|---|---|---|---|---|
| CU3..CU0 | | RP | FR | RE | MX | 0 | BEV | TS | SR | NMI | ASE | Impl | 0 | IM7..IM2 | IM1..IM0 | 0 | UM | R0 | ERL | EXL | IE |
| | | | | | | | | | | | | | | IPL | | KSU | | | | |

| Fields | | Description | Read/Write | Reset State | Compliance |
|---|---|---|---|---|---|
| Name | Bits | | | | |
| CU (CU3..CU0) | 31..28 | Controls access to coprocessors 3, 2, 1, and 0, respectively:<br><br>\| Encoding \| Meaning \|<br>\| --- \| --- \|<br>\| 0 \| Access not allowed \|<br>\| 1 \| Access allowed \|<br><br>Coprocessor 0 is always usable when the processor is running in Kernel Mode or Debug Mode, independent of the state of the CU0 bit. In Release 2 (and subsequent releases) of the Architecture, and for 64-bit implementations of Release 1 of the Architecture, execution of all floating point instructions, including those encoded with the COP1X opcode, is controlled by the CU1 enable. CU3 is no longer used and is reserved for future use by the Architecture.<br>If there is no provision for connecting a coprocessor, the corresponding CU bit must be ignored on write and read as zero. | R/W | Undefinded | Required for all implemented coprocessors |

| Fields | | Description | Read/ Write | Reset State | Compliance |
|---|---|---|---|---|---|
| Name | Bits | | | | |
| RP | 27 | Enables reduced power mode on some implementations. The specific operation of this bit is implementation dependent. If this bit is not implemented, it must be ignored on write and read as zero. If this bit is implemented, the reset state must be zero so that the processor starts at full performance. | R/W | 0 | Optional |

| Fields | | Description | Read/Write | Reset State | Compliance |
|---|---|---|---|---|---|
| Name | Bits | | | | |
| FR | 26 | In Release 1 of the Architecture, only MIPS64 processors could implement a 64-bit floating point unit. In Release 2 of the Architecture (and subsequent releases), both 32-bit and 64-bit processors can implement a 64-bit floating point unit. This bit is used to control the floating point register mode for 64-bit floating point units:<br><br>| Encoding | Meaning |<br>|---|---|<br>| 0 | Floating point registers can contain any 32-bit datatype. 64-bit datatypes are stored in even-odd pairs of registers. |<br>| 1 | Floating point registers can contain any datatype |<br><br>This bit must be ignored on write and read as zero under the following conditions:<br>• No floating point unit is implemented<br>• In a MIPS32 implementation of Release 2 of the Architecture<br>• In an implementation of Release 2 of the Architecture (and subsequent releases) in which a 64-bit floating point unit is not implemented<br>Certain combinations of the FR bit and other state or operations can cause UNPREDICTABLE behavior. | R/W | Undefinded | Required |

| Fields | | Description | Read/Write | Reset State | Compliance |
|---|---|---|---|---|---|
| Name | Bits | | | | |
| RE | 25 | Used to enable reverse-endian memory references while the processor is running in user mode:<br><br>| Encoding | Meaning |<br>|---|---|<br>| 0 | User mode uses configured endianness |<br>| 1 | User mode uses reversed endianness |<br><br>Neither Debug Mode nor Kernel Mode nor Supervisor Mode references are affected by the state of this bit. If this bit is not implemented, it must be ignored on write and read as zero. | R/W | Undefinded | Optional |

| Fields | | Description | Read/Write | Reset State | Compliance |
|---|---|---|---|---|---|
| Name | Bits | | | | |
| MX | 24 | Enables access to MDMX™ and MIPS® DSP resources on processors implementing one of these ASEs. If neither the MDMX nor the MIPS DSP ASE is implemented, this bit must be ignored on write and read as zero. <br><br> {Encoding table: 0 = Access not allowed; 1 = Access allowed} <br><br> Neither Debug Mode nor Kernel Mode nor Supervisor Mode references are affected by the state of this bit. If this bit is not implemented, it must be ignored on write and read as zero. | R if the processor implements neither the MDMX nor the MIPS DSP ASEs; otherwise R/W | 0 if the processor implements neither the MDMX nor the MIPS DSP ASEs; otherwise Undefined | Optional |

| Fields | | Description | Read/Write | Reset State | Compliance |
|---|---|---|---|---|---|
| Name | Bits | | | | |
| BEV | 22 | Controls the location of exception vectors:<br><br>| Encoding | Meaning |<br>|---|---|<br>| 0 | Normal |<br>| 1 | Bootstrap | | R/W | 1 | Required |

| Fields | | Description | Read/Write | Reset State | Compliance |
|---|---|---|---|---|---|
| Name | Bits | | | | |
| TS | 21 | Indicates that the TLB has detected a match on multiple entries. It is implementation dependent whether this detection occurs at all, on a write to the TLB, or an access to the TLB. In Release 2 of the Architecture (and subsequent releases), multiple TLB matches may only be reported on a TLB write. When such a detection occurs, the processor initiates a machine check exception and sets this bit. It is implementation dependent whether this condition can be corrected by software. If the condition can be corrected, this bit should be cleared by software before resuming normal operation. If this bit is not implemented, it must be ignored on write and read as zero.<br>Software should not write a 1 to this bit when its value is a 0, thereby causing a 0-to-1 transition. If such a transition is caused by software, it is UNPREDICTABLE whether hardware ignores the write, accepts the write with no side effects, or accepts the write and initiates a machine check exception. | R/W | 0 | Required if the processor detects and reports a match on multipleTLB entries |

| Fields | | Description | Read/Write | Reset State | Compliance |
|---|---|---|---|---|---|
| Name | Bits | | | | |
| SR | 20 | Indicates that the entry through the reset exception vector was due to a Soft Reset: <br><br> | Encoding | Meaning | <br> | 0 | Not Soft Reset (NMI or Reset) | <br> | 1 | Soft Reset | <br><br> Neither Debug Mode nor Kernel Mode nor Supervisor Mode references are affected by the state of this bit. If this bit is not implemented, it must be ignored on write and read as zero. | R/W | 1 for Soft Reset; 0 otherwise | Required if Soft Reset is implemented |

| Fields | | Description | Read/ Write | Reset State | Compliance |
|---|---|---|---|---|---|
| Name | Bits | | | | |
| NMI | 19 | Indicates that the entry through the reset exception vector was due to an NMI exception:<br><br>| Encoding | Meaning |<br>|---|---|<br>| 0 | Not NMI (Soft Reset or Reset) |<br>| 1 | NMI |<br><br>If this bit is not implemented, it must be ignored on write and read as zero. Software should not write a 1 to this bit when its value is a 0, thereby causing a 0-to-1 transition. If such a transition is caused by software, it is UNPREDICTABLE whether hardware ignores or accepts the write. | R/W | 1 for NMI; 0 otherwise | Required if NMI is implemented |

| Fields | | Description | Read/Write | Reset State | Compliance |
|---|---|---|---|---|---|
| Name | Bits | | | | |
| ASE | 18 | This bit is reserved for the MCU ASE. If MCU ASE is not implemented, then this bit must be written as zero; returns zero on read. | 0 if MCU ASE is not implemented | 0 if MCU ASE is not implemented | Required for MCU ASE; Otherwise Reserved |

| Fields | | Description | Read/Write | Reset State | Compliance |
|---|---|---|---|---|---|
| Name | Bits | | | | |
| Impl | 17..16 | These bits are implementation dependent and are not defined by the architecture. If they are not implemented, they must be ignored on write and read as zero. | | Undefined | Optional |

| Fields | | Description | Read/ Write | Reset State | Compliance |
|---|---|---|---|---|---|
| Name | Bits | | | | |
| IM7..IM2 | 15..10 | Interrupt Mask: Controls the enabling of each of the hardware interrupts.<br><br>| Encoding | Meaning |<br>|---|---|<br>| 0 | Interrupt request disabled |<br>| 1 | Interrupt request enabled |<br><br>In implementations of Release 2 of the Architecture in which EIC interrupt mode is enabled (Config3$_{VEIC}$ = 1), these bits take on a different meaning and are interpreted as the IPL field, described below. | R/W | Undefined | Required |

| Fields | | Description | Read/ Write | Reset State | Compliance |
|---|---|---|---|---|---|
| Name | Bits | | | | |
| IPL | 15..10 | Interrupt Priority Level. In implementations of Release 2 of the Architecture (and subsequent releases) in which EIC interrupt mode is enabled (Config3$_{VEIC}$ = 1), this field is the encoded (0..63) value of the current IPL. An interrupt will be signaled only if the requested IPL is higher than this value. If EIC interrupt mode is not enabled (Config3VEIC = 0), these bits take on a different meaning and are interpreted as the IM7..IM2 bits, described above. | R/W | Undefined | Optional (Release 2 and EIC interrupt mode only) |

| Fields | | Description | Read/ Write | Reset State | Compliance |
|---|---|---|---|---|---|
| Name | Bits | | | | |
| IM1..IM0 | 9..8 | Interrupt Mask: Controls the enabling of each of the software interrupts.<br><br>| Encoding | Meaning |<br>|---|---|<br>| 0 | Interrupt request disabled |<br>| 1 | Interrupt request enabled |<br><br>In implementations of Release 2 of the Architecture in which EIC interrupt mode is enabled (Config3$_{VEIC}$ = 1), these bits take on a different meaning and are interpreted as the IPL field, described below. | R/W | Undefined | Required |

| Fields | | Description | Read/Write | Reset State | Compliance |
|---|---|---|---|---|---|
| Name | Bits | | | | |
| 0 | 23, 7..5 | Must be written as zero; returns zero on reads | R | 0 | Reserved |

| Fields | | Description | Read/Write | Reset State | Compliance |
|---|---|---|---|---|---|
| Name | Bits | | | | |
| UM | 4 | If Supervisor Mode is not implemented, this bit denotes the base operating mode of the processor. The encoding of this bit is:<br><br>| Encoding | Meaning |<br>|---|---|<br>| 0 | Base mode is Kernel Mode |<br>| 1 | Base mode is User Mode |<br><br>Note: This bit overlaps the KSU field, described above. | R/W | Undefined | Required |

| Fields | | Description | Read/Write | Reset State | Compliance |
|---|---|---|---|---|---|
| Name | Bits | | | | |
| RO | 3 | If Supervisor Mode is not implemented, this bit is reserved. This bit must be ignored on write and read as zero.<br>Note: This bit overlaps the KSU field, described above. | R | 0 | Reserved |

| Fields | | Description | Read/ Write | Reset State | Compliance |
|---|---|---|---|---|---|
| Name | Bits | | | | |
| ERL | 2 | Error Level; Set by the processor when a Reset, Soft Reset, NMI or Cache Error exception are taken.<br><br>| Encoding | Meaning |<br>|---|---|<br>| 0 | Normal level |<br>| 1 | Error level |<br><br>When ERL is set:<br>• The processor is running in kernel mode<br>• Hardware and software interrupts are disabled<br>• The ERET instruction will use the return address held in ErrorEPC instead of EPC<br>• Segment kuseg is treated as an unmapped and uncached region. This allows main memory to be accessed in the presence of cache errors. The operation of the processor is UNDEFINED if the ERL bit is set while the processor is executing instructions from kuseg. | R/W | 1 | Required |

| Fields | | Description | Read/ Write | Reset State | Compliance |
|---|---|---|---|---|---|
| Name | Bits | | | | |
| EXL | 1 | Exception Level; Set by the processor when any exception other than Reset, Soft Reset, NMI or Cache Error exception are taken.<br><br>| Encoding | Meaning |<br>|---|---|<br>| 0 | Normal level |<br>| 1 | Exception level |<br><br>When EXL is set:<br>• The processor is running in Kernel Mode<br>• Hardware and software interrupts are disabled.<br>• TLB Refill exceptions use the general exception vector instead of the TLB Refill vector.<br>• EPC, CauseBD and SRSCtl (implementations of Release 2 of the Architecture only) will not be updated if another exception is taken | R/W | Undefined | Required |

| Fields | | Description | Read/Write | Reset State | Compliance |
|---|---|---|---|---|---|
| Name | Bits | | | | |
| IE | 0 | Interrupt Enable: Acts as the master enable for software and hardware interrupts:<br><br>\| Encoding \| Meaning \|<br>\|---\|---\|<br>\| 0 \| Interrupts are disabled \|<br>\| 1 \| Interrupts are enabled \|<br><br>In Release 2 of the Architecture (and subsequent releases), this bit may be modified separately via the DI and EI instructions. | R/W | Undefined | Required |

FIG. 5T

| 31 30 29 | 26 25 | 22 21 | 18 17 | 15 | 12 11 | 10 9 | 6 5 4 | 3 0 |
|---|---|---|---|---|---|---|---|---|
| 000 | HSS | 00000 | EICSS | 000 | ESS | 000 | PSS | 0 00 | CSS |

Example Format of SRSCtl COP0 Register

| Fields | | Description | Read/Write | Reset State | Compliance |
|---|---|---|---|---|---|
| Name | Bits | | | | |
| 0 | 31..30 | Must be written as zero; returns zero on read. | 0 | 0 | Reserved |

| Fields | | Description | Read/ Write | Reset State | Compliance |
|---|---|---|---|---|---|
| Name | Bits | | | | |
| HSS | 29..26 | Highest Shadow Set. This field contains the highest shadow set number that is implemented by this processor. A value of zero in this field indicates that only the normal GPRs are implemented. A non-zero value in this field indicates that the implemented shadow sets are numbered 0..n, where n is the value of the field. The value in this field also represents the highest value that can be written to the ESS, EICSS, PSS, and CSS fields of this register, or to any of the fields of the SRSMap register. The operation of the processor is UNDEFINED if a value larger than the one in this field is written to any of these other values. | R | Preset | Required |

| Fields | | Description | Read/Write | Reset State | Compliance |
|---|---|---|---|---|---|
| Name | Bits | | | | |
| 0 | 25..22 | Must be written as zero; returns zero on read. | 0 | 0 | Reserved |

| Fields | | Description | Read/ Write | Reset State | Compliance |
|---|---|---|---|---|---|
| Name | Bits | | | | |
| EICSS | 21..18 | EIC interrupt mode shadow set. If Config3$_{VEIC}$ is 1 (EIC interrupt mode is enabled), this field is loaded from the external interrupt controller for each interrupt request and is used in place of the SRSMap register to select the current shadow set for the interrupt.<br>If Config3$_{VEIC}$ is 0, this field must be written as zero, and returns zero on read. | R | Undefined | Required (EIC interrupt mode only) |

| Fields | | Description | Read/ Write | Reset State | Compliance |
|---|---|---|---|---|---|
| Name | Bits | | | | |
| 0 | 17..16 | Must be written as zero; returns zero on read. | 0 | 0 | Reserved |

| Fields | | Description | Read/Write | Reset State | Compliance |
|---|---|---|---|---|---|
| Name | Bits | | | | |
| ESS | 15..12 | Exception Shadow Set. This field specifies the shadow set to use on entry to Kernel Mode caused by any exception other than a vectored interrupt.<br>The operation of the processor is UNDEFINED if software writes a value into this field that is greater than the value in the HSS field. | R/W | 0 | Required |

| Fields | | Description | Read/Write | Reset State | Compliance |
|---|---|---|---|---|---|
| Name | Bits | | | | |
| 0 | 11..10 | Must be written as zero; returns zero on read. | 0 | 0 | Reserved |

| Fields | | Description | Read/Write | Reset State | Compliance |
|---|---|---|---|---|---|
| Name | Bits | | | | |
| PSS | 9..6 | Previous Shadow Set. If GPR shadow registers are implemented, and with the exclusions noted in the next paragraph, this field is copied from the CSS field when an exception or interrupt occurs. An ERET instruction copies this value back into the CSS field if $Status_{BEV} = 0$. This field is not updated on any exception which sets StatusERL to 1 (i.e., NMI or cache error), an entry into EJTAG Debug mode, or any exception or interrupt that occurs with $Status_{EXL} = 1$, or $Status_{BEV} = 1$. The operation of the processor is UNDEFINED if software writes a value into this field that is greater than the value in the HSS field. | R/W | 0 | Required |

| Fields | | Description | Read/ Write | Reset State | Compliance |
|---|---|---|---|---|---|
| Name | Bits | | | | |
| 0 | 5..4 | Must be written as zero; returns zero on read. | 0 | 0 | Reserved |

| Fields | | Description | Read/Write | Reset State | Compliance |
|---|---|---|---|---|---|
| Name | Bits | | | | |
| CSS | 3..0 | Current Shadow Set. If GPR shadow registers are implemented, this field is the number of the current GPR set. With the exclusions noted in the next paragraph, this field is updated with a new value on any interrupt or exception, and restored from the PSS field on an ERET. This field is not updated on any exception which sets $Status_{ERL}$ to 1 (i.e., NMI or cache error), an entry into EJTAG Debug mode, or any exception or interrupt that occurs with $Status_{EXL} = 1$, or $Status_{BEV} = 1$. Neither is it updated on an ERET with $Status_{ERL} = 1$ or $Status_{BEV} = 1$. The value of CSS can be changed directly by software only by writing the PSS field and executing an ERET instruction. | R | 0 | Required |

FIG. 7J

Example Format of Cause COP0 Register

800

| 31 | 30 | 29 28 | 27 | 26 | 25 24 | 23 | 22 | 21 | 20 | 18 17 16 15 | 10 9 | 8 7 | 6 2 | 1 0 |
|---|---|---|---|---|---|---|---|---|---|---|---|---|---|---|
| BD | TI | CE | DC | PCI | ASE | IV | WP | FDCI | 000 | ASE | IP9..IP2 | IP1..IP0 | EXC Code | 0 |
| | | | | | | | | | | ASE | RIPL | | 0 | |

| Fields | | Description | Read/Write | Reset State | Compliance |
|---|---|---|---|---|---|
| Name | Bits | | | | |
| BD | 31 | Indicates whether the last exception taken occurred in a branch delay slot:<br><br>| Encoding | Meaning |<br>|---|---|<br>| 0 | Not in delay slot |<br>| 1 | In delay slot |<br><br>The processor updates BD only if $Status_{EXL}$ was zero when the exception occurred. | R | Undefined | Required |

| Fields | | Description | Read/Write | Reset State | Compliance |
|---|---|---|---|---|---|
| Name | Bits | | | | |
| TI | 30 | Timer Interrupt. In an implementation of Release 2 of the Architecture, this bit denotes whether a timer interrupt is pending (analogous to the IP bits for other interrupt types):<br><br>| Encoding | Meaning |<br>|---|---|<br>| 0 | No timer interrupt is pending |<br>| 1 | Timer interrupt is pending |<br><br>In an implementation of Release 1 of the Architecture, this bit must be written as zero and returns zero on read. | R | Undefined | Required (Release 2) |

| Fields | | Description | Read/ Write | Reset State | Compliance |
|---|---|---|---|---|---|
| Name | Bits | | | | |
| CE | 29..28 | Coprocessor unit number referenced when a Coprocessor Unusable exception is taken. This field is loaded by hardware on every exception, but is UNPREDICTABLE for all exceptions except for Coprocessor Unusable. | R | Undefined | Required |

| Fields | | Description | Read/ Write | Reset State | Compliance |
|---|---|---|---|---|---|
| Name | Bits | | | | |
| DC | 27 | Timer Interrupt. In an implementation of Release 2 of the Architecture, this bit denotes whether a timer interrupt is pending (analogous to the IP bits for other interrupt types):<br><br>| Encoding | Meaning |<br>|---|---|<br>| 0 | Enable counting of Count register |<br>| 1 | Disable counting of Count register |<br><br>In an implementation of Release 1 of the Architecture, this bit must be written as zero and returns zero on read. | R/W | 0 | Required (Release 2) |

| Fields | | Description | Read/Write | Reset State | Compliance |
|---|---|---|---|---|---|
| Name | Bits | | | | |
| PCI | 26 | Performance Counter Interrupt. In an implementation of Release 2 of the Architecture (and subsequent releases), this bit denotes whether a performance counter interrupt is pending (analogous to the IP bits for other interrupt types):<br><br>| Encoding | Meaning |<br>|---|---|<br>| 0 | No performance counter interrupt is pending |<br>| 1 | Performance counter interrupt is pending |<br><br>In an implementation of Release 1 of the Architecture, or if performance counters are not implemented (Config1$_{PC}$ = 0), this bit must be written as zero and returns zero on read. | R | Undefinded | Required (Release 2 and performance counters implemented) |

| Fields | | Description | Read/ Write | Reset State | Compliance |
|---|---|---|---|---|---|
| Name | Bits | | | | |
| ASE | 25; 24, 17:16 | These bits are reserved for the MCU ASE. If MCU ASE is not implemented, these bits return zero on reads and must be written with zeros. | | | Rrequired for MCU ASE; Otherwise Reserved |

| Fields | | Description | Read/Write | Reset State | Compliance |
|---|---|---|---|---|---|
| Name | Bits | | | | |
| IV | 23 | Indicates whether an interrupt exception uses the general exception vector or a special interrupt vector:<br><br>| Encoding | Meaning |<br>|---|---|<br>| 0 | Use the general exception vector (0x180) |<br>| 1 | Use the special interrupt vector (0x200) |<br><br>In implementations of Release 2 of the architecture (and subsequent releases), if the CauseIV is 1 and Status$_{BEV}$ is 0, the special interrupt vector represents the base of the vectored interrupt table. | R/W | Undefined | Required |

FIG. 9G

| Fields | | Description | Read/ Write | Reset State | Compliance |
|---|---|---|---|---|---|
| Name | Bits | | | | |
| WP | 22 | Indicates that a watch exception was deferred because $Status_{EXL}$ or $Status_{ERL}$ were a one at the time the watch exception was detected. This bit both indicates that the watch exception was deferred, and causes the exception to be initiated once $Status_{EXL}$ and $Status_{ERL}$ are both zero. As such, software must clear this bit as part of the watch exception handler to prevent a watch exception loop. Software should not write a 1 to this bit when its value is a 0, thereby causing a 0-to-1 transition. If such a transition is caused by software, it is UNPREDICTABLE whether hardware ignores the write, accepts the write with no side effects, or accepts the write and initiates a watch exception once $Status_{EXL}$ and $Status_{ERL}$ are both zero. If watch registers are not implemented, this bit must be ignored on write and read as zero. | R/W | Undefined | Required if watch registers are implemented |

| Fields | | Description | Read/ Write | Reset State | Compliance |
|---|---|---|---|---|---|
| Name | Bits | | | | |
| FDCI | 21 | Fast Debug Channel Interrupt. This bit denotes whether a FDC interrupt is pending :<br><br>| Encoding | Meaning |<br>|---|---|<br>| 0 | No FDCinterrupt is pending |<br>| 1 | FDC interrupt is pending | | R | Undefined | Required |

| Fields | | Description | Read/ Write | Reset State | Compliance |
|---|---|---|---|---|---|
| Name | Bits | | | | |
| IP7..IP2 | 15..10 | Indicates an interrupt is pending:<br><br>| Bit | Name | Meaning |<br>|---|---|---|<br>| 15 | IP7 | Hardware Interrupt 5 |<br>| 14 | IP6 | Hardware Interrupt 4 |<br>| 13 | IP5 | Hardware Interrupt 3 |<br>| 12 | IP4 | Hardware Interrupt 3 |<br>| 11 | IP3 | Hardware Interrupt 2 |<br>| 10 | IP2 | Hardware Interrupt 1 |<br><br>In implementations of Release 1 of the Architecture, timer and performance counter interrupts are combined in an implementation-dependent way with hardware interrupt 5.<br>In implementations of Release 2 of the Architecture (and subsequent releases) in which EIC interrupt mode is not enabled (Config3$_{VEIC}$ = 0), timer and performance counter interrupts are combined in an implementation-dependent way with any hardware interrupt. If EIC interrupt mode is enabled (Config3$_{VEIC}$ = 1), these bits take on a different meaning and are interpreted as the RIPL field, described below. | R | Undefined | Required |

| Fields | | Description | Read/Write | Reset State | Compliance |
|---|---|---|---|---|---|
| Name | Bits | | | | |
| RIPL | ..10 | Requested Interrupt Priority Level.<br><br>In implementations of Release 2 of the Architecture (and subsequent releases) in which EIC interrupt mode is enabled (Config3$_{VEIC}$ = 1), this field is the encoded (0..63) value of the requested interrupt. A value of zero indicates that no interrupt is requested. If EIC interrupt mode is not enabled (Config3$_{VEIC}$ = 0), these bits take on a different meaning and are interpreted as the IP..IP2 bits, described above. | R | Undefined | Optional (Release 2 and EIC interrupt mode only) |

| Fields | | Description | Read/Write | Reset State | Compliance |
|---|---|---|---|---|---|
| Name | Bits | | | | |
| IP1..IP0 | 9..8 | Controls the request for software interrupts:<br><br>| Bit | Name | Meaning |<br>|---|---|---|<br>| 9 | IP1 | Request software interrupt 1 |<br>| 8 | IP0 | Request software interrupt 0 |<br><br>An implementation of Release 2 of the Architecture (and subsequent releases) which also implements EIC interrupt mode exports these bits to the external interrupt controller for prioritization with other interrupt sources. | R/W | Undefined | Required |

| Fields | | Description | Read/Write | Reset State | Compliance |
|---|---|---|---|---|---|
| Name | Bits | | | | |
| ExcCode | 6..2 | Exception code | R | Undefined | Required |

| Fields | | Description | Read/ Write | Reset State | Compliance |
|---|---|---|---|---|---|
| Name | Bits | | | | |
| 0 | 20..16, 7, 1..0 | Must be written as zero; returns zero on read. | 0 | 0 | Reserved |

FIG. 9N

Example Format of EPC Register 1000

| EPC |

| Fields | | Description | Read/Write | Reset State | Compliance |
|---|---|---|---|---|---|
| Name | Bits | | | | |
| EPC | 31..0 | Exception Program Counter | R/W | Undefined | Required |

FIG. 11

Example Format of Configuration COP0 Register

1200

| 31 | 30 29 | 25 | 23 22 | 21 20 19 18 | 17 16 | 15 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| M | BPG | 0 00000000 | IPLW | MMAR | MuCon | ISAonExc | ISA | URI | DSX | DSPP2P | DCTXC | ITL | LTPA | VEPE | VInCt | SCPDMM | SCMT | STML | TL |

| Fields | | Description | Read/Write | Reset State | Compliance |
|---|---|---|---|---|---|
| Name | Bits | | | | |
| M | 31 | This bit is reserved to indicate that a Config4 register is present. If the Config4 register is not implemented, this bit should read as a 0. If the Config4 register is implemented, this bit should read as a 1. | R | Preset | Required |

| Fields | | Description | Read/Write | Reset State | Compliance |
|---|---|---|---|---|---|
| Name | Bits | | | | |
| BPG | 30 | Big Pages feature is implemented. This bit indicates that TLB pages larger than 256 MB are supported and that C0_PageMask Register is 64-bits wide.<br><br>| Encoding | Meaning |<br>|---|---|<br>| 0 | Big Pages are not implemented. PageMask register is 32bits wide. |<br>| 1 | Big Pages are implemented and Page-Mask register is 64bits wide. | | R | Preset | Required |

| Fields | | Description | Read/Write | Reset State | Compliance |
|---|---|---|---|---|---|
| Name | Bits | | | | |
| 0 | 29:23, 12, 9, 3 | Must be written as zeros; returns zeros on read. | 0 | 0 | Reserved |

| Fields | | Description | Read/Write | Reset State | Compliance |
|---|---|---|---|---|---|
| Name | Bits | | | | |
| IPLW | 22:21 | Width of $Status_{IPL}$ and $Cause_{RIPL}$ fields:<br><br>| Encoding | Meaning |<br>|---|---|<br>| 0 | IPL and RIPL fields are 6-bits in width. |<br>| 1 | IPL and RIPL fields are 8-bits in width. |<br>| Others | Reserved |<br><br>If the IPL field is 8-bits in width, bits 18 and 16 of Status are used as the most significant bit and second most significant bit, respectively, of that field. If the RIPL field is 8-bits in width, bits 17 and 16 of Cause are used as the most significant bit and second most significant bit, respectively, of that field. | R | Preset | Required if MCU ASE is implemented |

| Fields | | Description | Read/Write | Reset State | Compliance |
|---|---|---|---|---|---|
| Name | Bits | | | | |
| MMAR | 20:18 | microMIPS32 Architecture revision level. MIPS32 Architecture revision level is denoted by the AR field of Config. <br><br> | Encoding | Meaning | <br> | 0 | Release3/MIPSr3 | <br> | 7-Jan | Reserved | <br><br>The processor updates BD only if Status$_{EXL}$ was zero when the exception occurred. | R | Preset | Required if microMIPS is implemented |

| Fields | | Description | Read/ Write | Reset State | Compliance |
|---|---|---|---|---|---|
| Name | Bits | | | | |
| MCU | 17 | MIPS® MCU ASE is implemented.<br><br>| Encoding | Meaning |<br>|---|---|<br>| 0 | MCU ASE is not implemented. |<br>| 1 | MCU ASE is implemented | | R | Preset | Required if MCU ASE is implemented |

| Fields | | Description | Read/Write | Reset State | Compliance |
|---|---|---|---|---|---|
| Name | Bits | | | | |
| ISAOn-Exc | 16 | Reflects the Instruction Set Architecture used after vectoring to an exception. Affects all exceptions whose offsets are relative to EBase.<table><tr><th>Encoding</th><th>Meaning</th></tr><tr><td>0</td><td>MIPS32is used on entrance to an exception vector.</td></tr><tr><td>1</td><td>microMIPS is used on entrance to an exception vector.</td></tr></table> | RW | Undefined | Required if microMIPS is implemented |

| Fields | | Description | Read/ Write | Reset State | Compliance |
|---|---|---|---|---|---|
| Name | Bits | | | | |
| ISA | 15:14 | Indicates Instruction Set Availability.<br><br>| Encoding | Meaning |<br>|---|---|<br>| 0 | Only MIPS32 Instruction Set is implemented. |<br>| 1 | Only microMIPS32 is implemented. |<br>| 2 | Both MIPS32 and microMIPS32 ISAs are implemented. MIPS32 ISA used when coming out of reset. |<br>| 2 | Both MIPS32 and microMIPS32 ISAs are implemented. microMIPS32 ISA used when coming out of reset. | | R | Preset | Required if MCU ASE is implemented |

| Fields | | Description | Read/Write | Reset State | Compliance |
|---|---|---|---|---|---|
| Name | Bits | | | | |
| ULRI | 13 | UserLocal register implemented. This bit indicates whether the UserLocal coprocessor 0 register is implemented.<br><br>{| Encoding | Meaning \|<br>\| 0 | UserLocal register is not implemented \|<br>\| 1 | UserLocal register is implemented \|} | R | Preset | Required |

| Fields | | Description | Read/Write | Reset State | Compliance |
|---|---|---|---|---|---|
| Name | Bits | | | | |
| RXI | 12 | Indicates whether the RIE and XIE bits exist within the PageGrain register.<br><br>| Encoding | Meaning |<br>|---|---|<br>| 0 | The RIE and XIE bits are not implemented within the PageGrain register. |<br>| 1 | The RIE and XIE bits are implemented within the PageGrain register. | | R | Preset | Required |

| Fields | | Description | Read/Write | Reset State | Compliance |
|---|---|---|---|---|---|
| Name | Bits | | | | |
| DSP2P | 11 | MIPS® DSP ASE Revision 2 implemented. This bit indicates whether Revision 2 of the MIPS DSP ASE is implemented.<br><br>| Encoding | Meaning |<br>|---|---|<br>| 0 | Revision 2 of the MIPS DSP ASE is not implemented |<br>| 1 | Revision 2 of the MIPS DSP ASE is implemented | | R | Preset | Required |

| Fields | | Description | Read/Write | Reset State | Compliance |
|---|---|---|---|---|---|
| Name | Bits | | | | |
| DSPP | 10 | MIPS® DSP ASE implemented. This bit indicates whether the MIPS DSP ASE is implemented. <br><br> | Encoding | Meaning | <br> 0 | MIPS DSP ASE is not implemented <br> 1 | MIPS DSP ASE is implemented | R | Preset | Required |

| Fields | | Description | Read/Write | Reset State | Compliance |
|---|---|---|---|---|---|
| Name | Bits | | | | |
| CTXTC | 9 | ContextConfig register is implemented and the width of the BadVPN2 field within the Config register depends on the contents of the ContextConfig register.<br><br>| Encoding | Meaning |<br>|---|---|<br>| 0 | ContextConfig is not implemented. |<br>| 1 | ContextConfig is implemented and is used for the Config$_{BadVPN2}$ field. | | R | Preset | Required |

| Fields | | Description | Read/Write | Reset State | Compliance |
|---|---|---|---|---|---|
| Name | Bits | | | | |
| ITL | 8 | MIPS® IFlowTrace™ mechanism implemented. This bit indicates whether the MIPS IFlowTrace is implemented.<br><br>| Encoding | Meaning |<br>\|---\|---\|<br>\| 0 \| MIPS IFlowTrace is not implemented \|<br>\| 1 \| MIPS IFlowTrace is implemented \| | R | Preset | Required (Release 2.1 Only) |

| Fields | | Description | Read/Write | Reset State | Compliance |
|---|---|---|---|---|---|
| Name | Bits | | | | |
| LPA | 7 | Denotes the presence of support for large physical addresses on MIPS64 processors. Not used by MIPS32 processors and returns zero on read. For implementations of Release 1 of the Architecture, this bit returns zero on read. | R | Preset | Required |

| Fields | | Description | Read/Write | Reset State | Compliance |
|---|---|---|---|---|---|
| Name | Bits | | | | |
| DC | 27 | Timer Interrupt. In an implementation of Release 2 of the Architecture, this bit denotes whether a timer interrupt is pending (analogous to the IP bits for other interrupt types):<br><br>| Encoding | Meaning |<br>|---|---|<br>| 0 | Enable counting of Count register |<br>| 1 | Disable counting of Count register |<br><br>In an implementation of Release 1 of the Architecture, this bit must be written as zero and returns zero on read. | R/W | 0 | Required (Release 2 Only) |

| Fields | | Description | Read/Write | Reset State | Compliance |
|---|---|---|---|---|---|
| Name | Bits | | | | |
| VEIC | 6 | Support for an external interrupt controller is implemented.<br><br>| Encoding | Meaning |<br>|---|---|<br>| 0 | Support for EIC interrupt mode is not implemented |<br>| 1 | Support for EIC interrupt mode is implemented |<br><br>For implementations of Release 1 of the Architecture, this bit returns zero on read. This bit indicates not only that the processor contains support for an external interrupt controller, but that such a controller is attached. | R | Preset | Required (Release 2.1 Only) |

| Fields | | Description | Read/Write | Reset State | Compliance |
|---|---|---|---|---|---|
| Name | Bits | | | | |
| Vint | 5 | Vectored interrupts implemented. This bit indicates whether vectored interrupts are implemented.<br><br>| Encoding | Meaning |<br>|---|---|<br>| 0 | Vector interrupts are not implemented |<br>| 1 | Vectored interrupts are implemented |<br><br>For implementations of Release 1 of the Architecture, this bit returns zero on read. | R | Preset | Required (Release 2.1 Only) |

| Fields | | Description | Read/Write | Reset State | Compliance |
|---|---|---|---|---|---|
| Name | Bits | | | | |
| SP | 4 | Small (1KByte) page support is implemented, and the PageGrain register exists <br><br> | Encoding | Meaning | <br> 0 | Small page support is not implemented | <br> 1 | Small page support is implemented | <br><br>For implementations of Release 1 of the Architecture, this bit returns zero on read. | R | Preset | Required (Release 2.1 Only) |

| Fields | | Description | Read/Write | Reset State | Compliance |
|---|---|---|---|---|---|
| Name | Bits | | | | |
| CDMM | 3 | Common Device Memory Map implemented. This bit indicates whether the CDMM is implemented.<br><br>\| Encoding \| Meaning \|<br>\|---\|---\|<br>\| 0 \| CDMM is not implemented \|<br>\| 1 \| CDMM is implemented \| | R | Preset | Required |

FIG. 13T

| Fields | | Description | Read/Write | Reset State | Compliance |
|---|---|---|---|---|---|
| Name | Bits | | | | |
| MT | 2 | MIPS® MT ASE implemented. This bit indicates whether the MIPS MT ASE is implemented. <table><tr><th>Encoding</th><th>Meaning</th></tr><tr><td>0</td><td>MIPS MT ASE is not implemented</td></tr><tr><td>1</td><td>MIPS MT ASE is implemented</td></tr></table> | R | Preset | Required |

| Fields | | Description | Read/Write | Reset State | Compliance |
|---|---|---|---|---|---|
| Name | Bits | | | | |
| SM | 1 | SmartMIPS™ ASE implemented. This bit indicates whether the SmartMIPS ASE is implemented.<br><br>| Encoding | Meaning |<br>|---|---|<br>| 0 | SmartMIPS ASE is not implemented |<br>| 1 | SmartMIPS ASE is implemented | | R | Preset | Required |

| Fields | | Description | Read/Write | Reset State | Compliance |
|---|---|---|---|---|---|
| Name | Bits | | | | |
| TL | 0 | Trace Logic implemented. This bit indicates whether PC or data trace is implemented. <br><br> | Encoding | Meaning | <br> | 0 | Trace logic is not implemented | <br> | 1 | Trace logic is implemented | | R | Preset | Required |

FIG. 13W

Format of IRET Instruction

| POOL32A (COP0) 000000 (010000) 6 | 000 0000 0011 0100 1101 (00 0000 0000 0000 0000) 20 | POOL32AXf (IRET) 111100 (111000) 6 |
|---|---|---|

SYSTEM AND METHOD FOR AUTOMATIC HARDWARE INTERRUPT HANDLING

BACKGROUND

1. Field of Invention

Embodiments of the present invention relate generally to microprocessors and in particular to interrupt handling.

2. Related Art

Within a computer processing environment, an interrupt is an event that interrupts normal program execution. Programs typically execute on a microprocessor in an ordered fashion. Typical execution is altered by instructions that expressly cause program flow to deviate, e.g., a jump instruction and a branch instruction. Interrupts disrupt normal execution of instructions. Typically upon detection of an interrupt, a special program known as an interrupt handler, or interrupt service routine, is executed that context switches the system. Context switching includes storing the state (e.g., context) of the processor, servicing the interrupt, and restoring the context of the process such that execution of instructions can be resumed from the point prior to the interrupt.

The process of context switching requires a large number of processor cycles during which the processor executes the interrupt service routine. This interrupt service routine typically flushes the processor's pipeline and saves numerous state registers in memory. As programs increase in complexity the time consumed performing interrupt service routines decreases availability of processor resources available for other program functions.

BRIEF SUMMARY

This section is for the purpose of summarizing some aspects of the present invention and to briefly introduce some embodiments of the invention. Simplifications or omissions may be made to avoid obscuring the purpose of the section. Such simplifications or omissions are not intended to limit the scope of the present invention.

Therefore, what is needed are methods and systems to service interrupt requests in a more timely and efficient manner.

In an embodiment of the invention, there is provided a processing system consisting of an interrupt pin, multiple registers, a stack pointer, and an automatic interrupt system. The multiple registers store a number of processor states values. When the system detects an interrupt on the interrupt pin the system prepares to enter an exception mode where the automatic interrupt system causes an interrupt vector to be fetched, the stack pointer to be updated, and the processor state values to be read in parallel from the registers and stored in memory locations based on the updated stack pointer, prior to the execution of an interrupt service routine.

In another embodiment of the invention, there is provided a method that includes receiving an interrupt request, fetching an interrupt vector, reading a number of processor state values in parallel, and storing the number of processor state values in memory locations specified by the updated stack register, in preparation for entering an exception mode and prior to execution of an interrupt service routine.

In a further embodiment of the invention, there is provided a non-transitory computer readable storage medium including computer readable program code for generating a processor where the program code includes computer-readable code to generate an interrupt pin, computer-readable code that generates a number of registers that store multiple processor state values, computer-readable code that generates a stack pointer, and computer-readable code that generates an automatic interrupt system. The automatic interrupt system detects an interrupt on the interrupt pin and fetches an interrupt vector, updates a stack pointer, and reads, in parallel, a number of processor state values from the registers and stores those values in memory locations specified by the updated stack pointer, prior to execution of an interrupt service routine.

These and other embodiments and features, as well as the structure and operation of various embodiments, are described in detail below with reference to the accompanying drawings. The invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of the present invention and, together with the description, further serve to explain the principles of the invention and to enable a person skilled in the relevant art(s) to make and use the invention.

FIG. 2 illustrates the format of an interrupt control register, according to an embodiment of the invention.

FIGS. 3A-3L present register field descriptions of registers within an interrupt control register, according to an embodiment of the present invention.

FIG. 4 illustrates the format of a status control register, according to an embodiment of the invention.

FIGS. 5A-5T present register field descriptions of registers within a status control register, according to an embodiment of the present invention.

FIG. 6 illustrates the format of a SRS control register, according to an embodiment of the invention.

FIGS. 7A-7J present register field descriptions of registers within a SRS control register, according to an embodiment of the present invention.

FIG. 8 illustrates the format of a Cause register, according to an embodiment of the invention.

FIGS. 9A-9N present register field descriptions of registers within a Cause register, according to an embodiment of the present invention.

FIG. 10 illustrates the format of an Exception Program Counter register, according to an embodiment of the invention.

FIG. 11 presents register field descriptions of registers within an Exception Program Counter register, according to an embodiment of the present invention.

FIG. 12 illustrates the format of a Configuration register, according to an embodiment of the invention.

FIGS. 13A-13W presents register field descriptions of registers within a Configuration register, according to an embodiment of the present invention.

FIG. 14 illustrates the layout and naming of an interrupt return instruction, according to an embodiment of the present invention.

Figure 1:
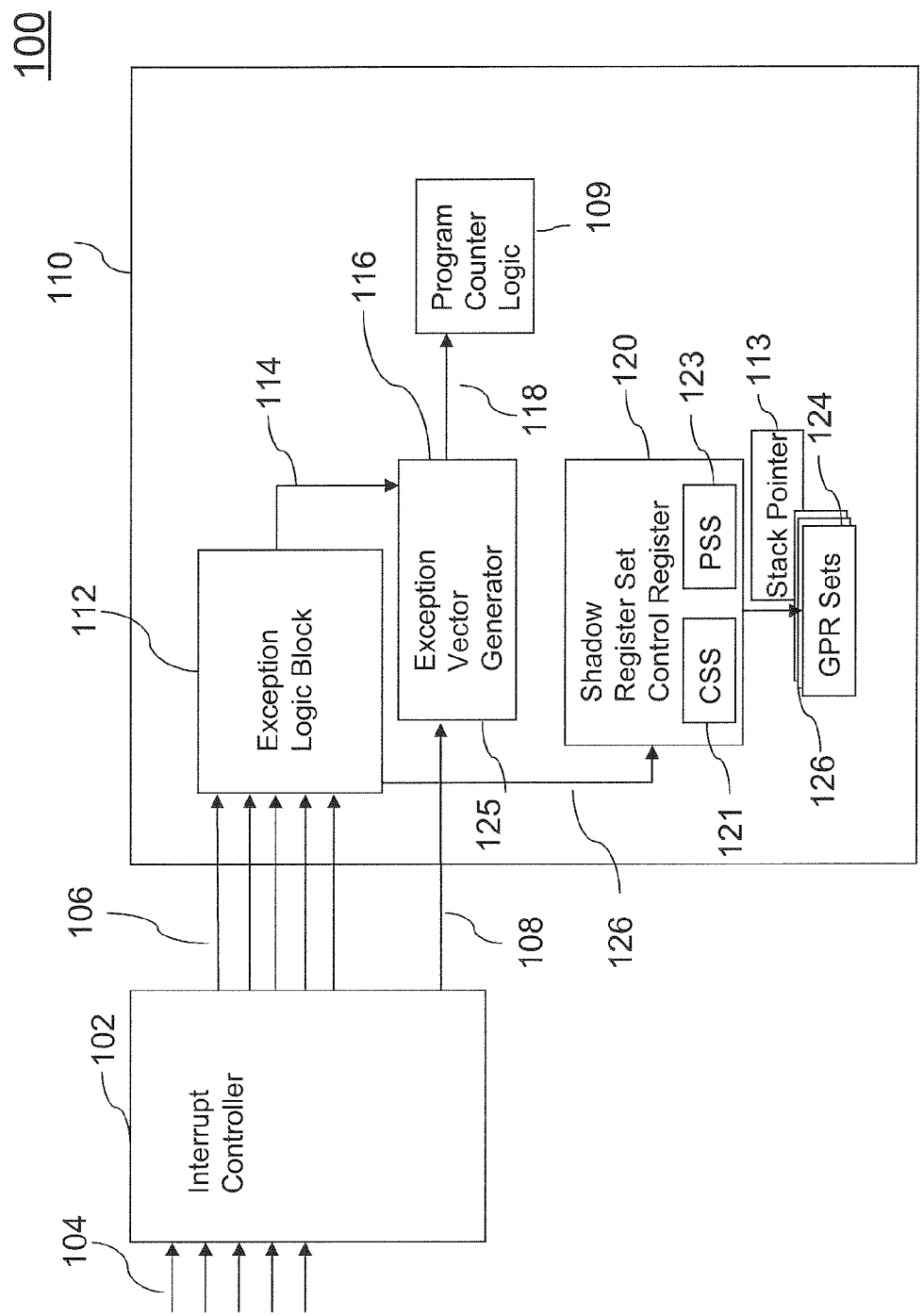
FIG. 1 is a block diagram of a processing system, according to an embodiment of the invention.

Features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The invention will be better understood from the following descriptions of various "embodiments" of the invention. Thus, specific "embodiments" are views of the invention, but each does not itself represent the whole invention. In many cases individual elements from one particular embodiment may be substituted for different elements in another embodiment carrying out a similar or corresponding function. It is expected that those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

I. Automatic Hardware Interrupt Handling

FIG. 1 is a block diagram of a processing system 100 including a system for automatic hardware interrupt handling, according to an embodiment of the present invention. The system 100 includes a processor 110 coupled to an interrupt controller 102 where interrupt controller 102 is connected to a number of interrupt lines 104. Interrupt controller 102 prioritizes interrupts 104 and generates interrupt requests to processor 110 using interrupt lines 106. Interrupt controller 102 can also pass interrupt vector 108 to processor 110.

Within processor 110 there exists an exception logic block 112, an interrupt vector generator 116, a shadow register set control register 120, a general purpose register set 124, and a number of shadow register sets 126. In an embodiment, shadow register sets 126 are substitutes for the normal general purpose register (GPR) 124 that can be used in certain processor modes of operation, e.g., Kernel Mode and Exception Mode, or in response to a vectored interrupt or exception. Once a shadow register set 126 is bound to a particular mode, reference to addressable registers in the GPR 124 work with a particular shadow register set that is dedicated to that mode.

Exception logic block 112 within processor 110 receives interrupt lines 106 and determines which, if any, exception is to be processed. If an exception, e.g., an interrupt, is to be processed, exception logic block 112 send signals 114 to exception vector generator 125. Exception vector generator 125 uses signals 114 to create instruction address 118 to be used to handle the exception. Exception vector generator 125 may also receive vector 108 directly from interrupt controller 102. Instruction address 118 is then sent to program counter logic 109 to change the flow of the instruction execution.

The shadow register set control register 120 contains a Current Shadow Set (CSS) register 121 and a Previous Shadow Set (PSS) register 123. Exception logic block 112 sends signals 126 to shadow register set control register 120 and associated logic to switch to the appropriate shadow register set that was assigned for the exception that is to be handled. As previously described, there is the need to reduce the time required to service interrupt service requests. In an embodiment, Table 1 below outlines the number of cycles processor 110 must expend in order to start execution of an interrupt service routine generated by the detection of an interrupt, e.g., interrupts 104 and 114, by the use of software based interrupt handling.

One possible format of an interrupt control register is shown in FIG. 2 and will be discussed in further detail later. Example field descriptions of registers within an interrupt control register can be found in FIGS. 3A-3L and will be discussed in further detail later.

An example format of a COP0 status register in system 400 is shown in FIG. 4. Example field descriptions of registers within a status register can be found in FIGS. 5A-5T of system 500, according to an embodiment of the invention.

An example format of a COP0 SRSCtl register in system 600 is shown in FIG. 6. Example field descriptions of registers within a SRSCtl register are shown in FIGS. 7A-7J of system 700.

An example format of a COP0 Cause register in system 800 is shown in FIG. 8. Example field descriptions of registers within a Cause register is shown in FIGS. 9A-9N of system 900.

An example format of an COP0 EPC register in system 1000 is shown in FIG. 10. Example field descriptions of registers within an EPC register are shown in FIG. 11 of system 1100.

An example format of a COP0 Configuration register in system 1200 is shown in FIG. 12. Example field descriptions of registers within a Configuration register are shown in FIGS. 13A-13W of system 1300.

TABLE 1

Clock cycles Associated with Interrupt Service Routine (ISR) Processing

| Cycles | Event | Hardware/Software |
|---|---|---|
| 2 | Signal Latched | HARDWARE |
| 3 | Pipeline Flushed | HARDWARE |
| 1 | Interrupt Prioritized | HARDWARE |
| 4 | Fetch Interrupt Vector | HARDWARE |
| 0 | GPRs saved to Shadow Register Sets | HARDWARE |
| 2 | Adjust Stack Pointer | SOFTWARE |
| 2 | Save C0_Status to Stack | SOFTWARE |
| 2 | Save C0_SRSCtl to Stack | SOFTWARE |
| 2 | Save C0_EPC to Stack | SOFTWARE |
| 5 | Adjust Status, IPL, EXL | SOFTWARE |
| — | 1$^{st}$ Instruction of ISR | |
| 24 | Total | |

As Table 1 indicates, a total of 24 cycles are expended from the point the interrupt is latched to when the first instruction of the interrupt service routine is executed. In another embodiment, Table 2 below outlines the number of cycles processor 110 must expend in order to start execution of an interrupt service routine generated by the detection of an interrupt, e.g., interrupts 104 and 114, by the use of hardware based interrupt handling logic using Interrupt Automated Prologue (IAP).

TABLE 2

Clock cycles Associated with Interrupt Service Routine (ISR) Processing using IAP.

| Cycles | Event | Hardware/Software |
|---|---|---|
| 2 | Signal Latched | HARDWARE |
| 3 | Pipeline Flushed and Interrupt Vector is Speculatively Fetched | HARDWARE |
| 1 | Interrupt Prioritized and Interrupt Vector is Refetched if other Exception | HARDWARE |
| 4 | Fetch Interrupt Vector | HARDWARE |
| 0 | GPRs saved to Shadow Register Sets | HARDWARE |
| 1 | Read C0_Status, C0_SRSCtl, C0_EPC in parallel, Adjust Stack Pointer | HARDWARE |
| 3 | Save C0_Status, C0_SRSCtl, C0_EPC to Stack and Adjust Status, IPL, EXL | HARDWARE |
| — | 1$^{st}$ Instruction of ISR | |
| 10 | Total | |

As Table 1 indicates, the number of cycles expended from the point the interrupt is latched and when the first instruction of the interrupt service routine is executed is decreased to 10, from 24, by the use of IAP.

II. Interrupt Automated Prologue (IAP)

The use of Shadow Register Sets can decrease the overhead of saving usermode state values before executing an interrupt service routine. The Interrupt Automated Prologue (IAP) feature automates some of the software steps that would be needed to save control and status registers, e.g., COP0, state values before executing an interrupt service routine. Decreased latency to executing the first useful instruction of an interrupt service routine can be achieved by executing some of the steps using parallel hardware instead of serial execution of instructions.

In an embodiment, the IAP feature is only available when:
Shadow Register Sets are implemented ($SRSCtl_{HSS}!=0$)
External Interrupt Controller Mode is enabled ($Config3_{VEIC}=1$, $IntCtl_{VS}!=0$, $Cause_{IV}=1$, and $Status_{BEV}=0$)
$IntCtl_{APE}=1$ In an embodiment, the IAP feature only takes effect when an interrupt is signaled to the exception logic block and the exception priority logic has resolved the interrupt to be the highest priority exception to be handled. If an exception other than an interrupt is signaled, this feature does not take effect.

The IAP operation can be enabled with either a single stack pointer or with multiple stack pointers. In the example where only one stack pointer is being used the following steps are automated by the use of IAP:

1. If $IntCtl_{UseKStk}$ is zero, then TempStackPointer is updated with the value from GPR 29 of the Previous Shadow Register Set. If $IntCtl_{UseKStk}$ is one, go to Step A. (see below).
2. TempStackPointer is decremented by the value specified by the $IntCtl_{StkDec}$ register field.
3. The value in COP0 EPC register is stored to external memory using virtual address [TempStackPointer]+0x0.
4. The value in COP0 Status register is stored to external memory using virtual address [TempStackPointer]+0x4.
5. The value in COP0 SRSCtl register is stored to external memory using virtual address [TempStackPointer]+0x8.
6. GPR 29 of the Current Shadow Register Set is written with the value of TempStackPointer.
7. $Status_{IPL}$ register field is updated with the value in $Cause_{RIPL}$.
8. If $IntCtl_{ClrEXL}$ is set, then KSU, ERL, and EXL fields of the Status register are cleared to zero.

The only sequence dependencies are (Implementations must maintain these dependencies):
Step 2 is dependent on Step 1 (or Step A below).
Steps 3-5 are dependent on Step 2.
Steps 7 & 8 are dependent on Step 4.
Steps 6-8 are dependent on Steps 3-5 reaching a stage at which no further exceptions can be generated.

In an embodiment, TempStackPointer is an internal register within the processor and is not visible to software. It is used so that the modification of GPR 29 does not happen until there is no longer any possibility of memory exceptions occurring during IAP. This allows the TLB handler to be used without modification for a TLB exception that happens during IAP.

In more complicated environments where multiple stack pointers are used, e.g., user-mode and kernel-mode, the $IntCtl_{UseKStk}$ control bit can be used to select another stack point for the interrupt handling. For example, GPR 29 of the Shadow Register Set is used to hold the kernel stack pointer. GPR 29 of the Shadow Register Set 1 can be pre-initialized to hold the appropriate kernel stack pointer value. In an embodiment, the following steps illustrate how IAP works when the pre-initialized stack point is used, e.g., $IntCtl_{UseKStk}$ is one.

A) If (interrupted instruction was executing in usermode) then TempStackPointer=GPR 29 of Shadow Register 1 else TempStackPointer=GPR 29 of Shadow Register Set used at the time of the interrupted instruction.
B) Go to Step 2 (above).

For Step A, if the interrupted instruction was already in kernel mode, then it would have been using the stack pointer value that was previously derived from the kernel stack pointer held in GPR 29 of Shadow Register 1.

III. Exceptions During IAP

In an embodiment, the memory store operations that occur during IAP may result in Address Error, e.g., address space privilege violation, TLB refill, e.g., TLB does not have an entry matching the requested address, TLB invalid, e.g., TLB entry matching the requested address is not valid, TLB modify, e.g., TLB entry matching the requested address is marked not-writeable and a store instruction is attempting to write a location within the entry's page, Cache Error, e.g., the lookup within the cache memory hierarchy resulted in a parity or uncorrectable Error-Correction-Code error instead of returning the request data, and Bus Error, e.g., the lookup within the external memory hierarchy resulted in an error instead of returning the requested data. exceptions. For example, if such memory exceptions occur during IAP:

The $Cause_{ExcCode}$ register field reports the exception type.
$Cause_{AP}$ register bit is set.
EPC is unchanged; points to the instruction which was originally interrupted.
All of the other exception reporting COP0 registers are updated as appropriate for the exception type. These registers reflect the effective word address that caused the exception, e.g., as if an individual SW instruction had caused the exception.
If the memory store operation uses a mapped address and there is no matching address in the TLB, the TLB refill exception handler (offset 0x0) is used. The other TLB related exceptions (invalid, modify) use the general exception handler (offset 0x180).

The Shadow Register Set designated by the $SRSCtl_{ESS}$ register field is used for the memory exception.

The exception handler returns to the original code PC location, which is held in C0_EPC.

Since the interrupt is still asserted, the interrupt is signaled again and IAP is repeated. This time, it completes as the faulting condition had previously been fixed.

In this example, the IAP feature will run to completion unless one of these memory exceptions takes place. The IAP feature is not interruptible, that is, IAP is atomic from the point of view of another pending interrupt.

IV. Interrupt Automated Epilogue (IAE)

In an embodiment, the Interrupt Automated Epilogue is the mirrored operation of IAP. In preparation for returning to non-exception mode, this feature automates restoring COP0 Status, SRSCtl, and EPC registers from the one or more stacks. In an embodiment, the IAE functionality is made available through an instruction, for example the IRET instruction. In an example, the IRET instruction should only be used when:

Shadow Register Sets are implemented ($SRSCtl_{HSS}$ !=0)
External Interrupt Controller Mode is enabled ($Config3_{VEIC}$=1, $IntCtl_{VS}$ !=0, $Cause_{IV}$=1, and $Status_{BEV}$=0)

The IRET instruction is meant to reverse the effects of the Automated Interrupt Prologue feature. So the IRET instruction should only be used when the COP0 registers are saved onto the stack in the manner specified by the IAP feature.

V. Exceptions During IAE

In an embodiment, the memory load operations that occur during IAE may result in Address Error, TLB refill, TLB invalid, Cache Error, and Bus Error exceptions. In an example, if such memory exceptions occur during IAE:

The $Cause_{ExcCode}$ register field reports the exception type
EPC is updated to the IRET instruction location.
All of the other exception reporting COP0 registers are updated as appropriate for the exception type. These registers reflect the effective word address that caused the exception, e.g., as if an individual LW instruction had caused the exception.
If the memory store operation uses a mapped address and there is no matching address in the TLB, the TLB refill exception handler (offset 0x0) is used. The other TLB related exceptions (invalid) use the general exception handler (offset 0x180).
The Shadow Register Set designated by the $SRSCtl_{ESS}$ register field is used for the memory exception.
The exception handler jumps to the IRET instruction, which is held in C0_EPC.
The IRET instruction now completes since the faulting condition was previously fixed. The IRET returns to the original code PC location, which is un-wound from the stack.

In this example, the IRET instruction will run to completion unless one of these memory exceptions takes place. The IRET instruction is not interruptible, that is, IRET is atomic from the point of view of another pending interrupt.

VI. Interrupt Chaining

In an embodiment, the concept of interrupt chaining reduces the number of cycles needed to respond to an interrupt that is pending when returning from the current interrupt. An interrupt may be pending because the current interrupt handler has disabled interrupts, or because the pending interrupt has lower priority than the interrupt which is currently being processed. Typically, software must disable interrupts when restoring registers from a stack when finishing handling an exception. During such a time, another interrupt could be signaled. In such a situation, the new interrupt would be ignored until an instruction, e.g., the ERET instruction, clears a status indicator, e.g., the EXL bit, and has started execution at the return address pointed to by a register holding the content of the program prior to jumping to an exception handler, e.g., the EPC register. In an embodiment, during this time, the pipeline is flushed to complete the exception handling. When the subsequent interrupt is finally recognized by the exception logic, a second pipeline flush is necessary as the processor was about start executing the instructions at the return address.

In an embodiment, the Interrupt Chaining feature avoids the above described pipeline flushes by allowing an Interrupt Controller, e.g., Interrupt Controller 102 or other External Interrupt Controller unit, to update the interrupt signals sent to exception logic block 112 before the IRET instruction completes. If these signals represent an interrupt that is of a higher priority than the current priority, e.g., in $Status_{IPL}$, the IRET instruction will update the COP0 registers as if just entering exception mode. The IRET instruction will then jump directly to the new interrupt vector, thus avoiding the following steps:

1. Flushing the pipeline in return to non-exception mode
2. Clearing the $Status_{EXL}$ bit
3. Returning to the EPC address
4. Flushing the pipeline a second time to enter exception mode.

In an embodiment, the Interrupt Chaining feature when used together with the Interrupt Automated Prolog and Interrupt Automated Epilog features also avoids the following steps:

Loading saved EPC and SRSCtl values from the stack before returning to the EPC instruction
Saving Status, EPC and SRSCtl values to the stack before processing the pending interrupt However, in an embodiment, Interrupt Chaining is made available through the IRET instruction and is only available when:

Shadow Register Sets are implemented ($SRSCtl_{HSS}$ !=0)
External Interrupt Controller Mode is enabled ($Config3_{VEIC}$=1, $IntCtl_{VS}$ !=0, $Cause_{IV}$=1, and $Status_{BEV}$=0)
$IntCtl_{ICE}$=1

FIG. 2 illustrates the layout and naming of an IntCtl register in system 200 referred to above, according to an embodiment of the present invention. FIGS. 3A-3L illustrate the naming and functionality of the fields within the IntCtl register in system 300 as shown in FIG. 2, according to an embodiment of the present invention. For example, FIGS. 3A, 3B and 3C describe, respectively, the IPTI, IPPCI, and IPFDC fields for interrupt compatibility and vectored interrupt modes. FIG. 3D describes the PF field for enabling the vector prefetching feature. FIG. 3E describes the ICE field for the IRET instruction that enables interrupt chaining. FIG. 3F describes the StkDec field used in the IAP feature that determines the number of words that are decremented from the value of stack pointer 113, e.g., GPR 29. FIG. 3G describes the ClrEXL field used in the IAP feature and the IRET instruction that determines if the KSU/ERL/EXL fields are cleared. FIG. 3H describes the APE field that determines if the IAP feature is enabled. FIG. 3I describes the UseKStk field that chooses which stack to use during IAP. FIGS. 3J and 3L describe reserved fields, not yet defined. FIG. 3K describes the VS field that specifies vector spacing.

VII. IRET Instruction

FIG. 14 illustrates the layout and naming of the IRET instruction referred to above, according to an embodiment of the present invention. The IRET instruction provides for an interrupt return with automated interrupt epilogue handling. The instruction can optionally jump directly to another interrupt vector without returning to the original return address as discussed above. The IRET instruction can be implemented in multiple instruction set architectures, for example the two possible numbering and names are shown in FIG. 4, the second set shown in parenthesis.

The IRET instruction automates some of the operations that are required when returning from an interrupt handler and can be used in place of other instructions at the end of interrupt handlers, e.g., ERET. The use of the IRET instruction is appropriate when using Shadow Register Sets and the EIC Interrupt mode. The automated operations of this instruction can be used to reverse the effects of the automated operations of the IAP feature.

If the EIC interrupt mode and the Interrupt Chaining feature are used, the IRET instruction can be used to shorten the time between returning from the current interrupt handler and handling the next requested interrupt.

If the Automated Prologue feature is disabled, then IRET behaves exactly like ERET.

If either the $Status_{ERL}$ or $Status_{BEV}$ bits are set, then IRET behaves exactly like ERET.

If Interrupt Chaining is disabled:
  Interrupts are disabled. COP0 Status, SRSCtl, and EPC registers are restored from the stack. GPR 29 is incremented for the stack frame size. IRET then clears execution and instruction hazards, conditionally restores $SRSCtl_{CSS}$ from $SRSCtl_{PSS}$, and returns at the completion of interrupt processing to the interrupted instruction pointed to by the EPC register.

If Interrupt Chaining is enabled:
  Interrupts are disabled. COP0 Status register is restored from the stack. The priority output of the External Interrupt Controller is compared with the IPL field of the Status register.

If $Status_{IPL}$ has a higher priority than the External Interrupt Controller value:
  COP0 SRSCtl and EPC registers are restored from the stack. GPR 29 is incremented for the stack frame size. IRET then clears execution and instruction hazards, conditionally restores $SRSCtl_{CSS}$ from $SRSCtl_{PSS}$, and returns to the interrupted instruction pointed to by the EPC register at the completion of interrupt processing.

If $Status_{IPL}$ has a lower priority than the External Interrupt Controller value:
  The value of GPR 29 is first saved to a temporary register then GPR 29 is incremented for the stack frame size. The EIC is signaled that the next pending interrupt has been accepted. This signaling will update the $Cause_{RIPL}$ and $SRSCtl_{EICSS}$ fields from the EIC output values. The $SRSCtl_{EICSS}$ field is copied to the $SRSCtl_{CSS}$ field, while the $Cause_{RIPL}$ field is copied to the $Status_{IPL}$ field. The saved temporary register is copied to the GPR 29 of the current SRS. The KSU and EXL fields of the Status register are optionally set to zero. No barrier for execution hazards or instruction hazards is created. IRET finishes by jumping to the interrupt vector driven by the EIC.

In an embodiment, the IRET instruction does not cause the execution of the next instruction (i.e., it has no delay slot). This instruction is re-startable if an exception occurs during the memory transactions accessing the stack. All of the stack memory transactions must be completed before Status, SRSCtl and EPC are modified by this instruction. If an exception occurs before IRET completes:
  1. the SRSCtl and EPC registers are not updated
  2. only the EXL bit has been changed in the Status register.

VIII. Restriction in the IRET Instruction

In an embodiment, the operation of the processor is UNDEFINED if the IRET instruction is executed in the delay slot of a branch or jump instruction.

The operation of the processor is UNDEFINED if MET is executed when either Shadow Register Sets are not enabled, or the EIC interrupt mode is not enabled.

In an example, if an IRET instruction is placed between an LL and SC instruction then such a placement will cause the SC instruction to fail.

The effective addresses used for stack transactions must be naturally-aligned. If either of the two least-significant bits of the address is non-zero, an Address Error exception occurs.

IRET implements a software barrier that resolves all execution and instruction hazards created by Coprocessor 0 state changes. The effects of this barrier begin with the instruction fetch and decode of the instruction at the PC to which the IRET returns.

In another embodiment, IRET does not restore $SRSCtl_{CSS}$ from $SRSCtl_{PSS}$ if $Status_{BEV}=1$ or $Status_{ERL}=1$, because any exception that sets $Status_{ERL}$ to 1 (Reset, Soft Reset, NMI, or cache error) does not save $SRSCtl_{CSS}$ in $SRSCtl_{PSS}$. If software sets $Status_{ERL}$ to 1, it must be aware of the operation of an IRET that may be subsequently executed.

The stack transactions behave as individual LW operations with respect to exception reporting.

A Coprocessor Unusable Exception is signaled if access to Coprocessor 0 is not enabled.

To enable a clean transition from exception-mode to non-exception-mode, all of the COP0 registers modifications as well as the stack pointer modification must be completed as if this instruction is atomic. This is, interrupts are not accepted while the operations of this instruction are being processed. As previously stated, the memory transactions that are part of this instruction can cause address error, bus-error, parity/ECC, TLB miss/invalid/write exceptions.

Table 3 below represents pseudo code associated with the operation of the IRET instruction as follows:

TABLE 3

IRET Pseudo code

```
if IsCoprocessorEnabled(0) then
  if (( IntCtl_APE == 0) | (Status_ERL == 1) | (Status_BEV ==1))
    Act as ERET // read Operation section of ERET description
  else
    if (ISAMode)
      EPC ← PC_31..1 || 1 // in case of memory exception
    else
      EPC ← PC // in case of memory exception
    endif
    temp ← 0×4 + GPR[29]
    tempStatus ← LoadStackWord(temp)
    ClearHazards( )
    if ( (IntCtl_ICE == 0) | ((IntCtl_ICE == 1) &
      (tempStatus_IPL > EIC_RIPL)) )
      temp ← 0×8 + GPR[29]
      tempSRSCtl ← LoadStackWord(temp)
      temp ← 0×0 + GPR[29]
      tempEPC ← LoadStackWord(temp)
    endif
    // Only modify COP0 registers after no further
    possible exceptions
    Status ← tempStatus
    if ( (IntCtl_ICE == 0) | ((IntCtl_ICE == 1) &
      (tempStatus_IPL > EIC_RIPL)) )
      GPR[29] ← GPR[29] + DecodedValue(IntCtl_StkDec)
      SRSCtl ← tempSRSCtl
      EPC ← tempEPC
```

TABLE 3-continued

IRET Pseudo code

```
        temp ← EPC
        Status_EXL ← 0
        if (ArchitectureRevision ≧ 2) and (SRSCtl_HSS > 0) and
            (Status_BEV = 0) then SRSCtl_CSS ← SRSCtl_PSS
        endif
        if IsMicroMIPSImplemented( ) then
            PC ← temp_31..1 || 0
            ISAMode ← temp0
        else
            PC ← temp
        endif
        LLbit ← 0
        Cause_IC ← 0
        ClearHazards( )
     else
        Signal_EIC_for_Next_Interrupt( )
        (wait for EIC outputs to update)
        Cause_RIPL ← EIC_RIPL
        SRSCtl_EICSS ← EIC_SS
        temp29 ← GPR[29]
        GPR[29] ← GRP[29] + DecodedValue(IntCtl_SikDec)
        Status_IPL ← Cause_RIPL
        SRSCtl_CSS ← SRSCtl_EICSS
        NewShadowSet ← SRSCtl_EICSS
        GPR[29] ← temp29
        if (IntCtl_ClrEXL == 1)
            Status_EXL ← 0
            Status_KSU ← 0
        endif
        Cause_IC ← 1
        ClearHazards( )
        PC ← CalcIntrptAddress( )
     endif
  endif
else
  SignalException(CoprocessorUnusable, 0)
endif
function LoadStackWord(vaddr)
   if vAddr_1..0 ≠ 0^2 then
        SignalException(AddressError)
   endif
   (pAddr, CCA) ← AddressTranslation (vAddr, DATA, LOAD)
   memword ← LoadMemory (CCA, WORD, pAddr, vAddr, DATA)
   LoadStackWord ← memword
endfunction LoadStackWord
function CalcIntrptAddress( )
   if StatusBEV = 1
        vectorBase ← 0xBFC0.0200
   else
        if (ArchitectureRevision ≧ 2)
            vectorBase ← EBase_31..12 || 0^11)
        else
            vectorBase ← 0x8000.0000
        endif
   endif
if (Cause_IV = 0)
   vectorOffset = 0x180
else
   if (Status_BEV = 1) or (IntCtl_VS = 0)
        vectorOffset = 0x200
   else
        if (Config3_VEIC = 1 and EIC_Option=1)
            VectorNum = CauseRIPL
        elseif (Config3_VEIC = 1 and EIC_Option=2)
            VectorNum = EIC_VectorNum
        elseif (Config3_VEIC = 0 )
            VectorNum = VIntPriorityEncoder( )
        endif
        if (Config3_VEIC = 1 and EIC_Option=3)
            vectorOffset = EIC_VectorOffset
        else
            vectorOffset = 0x200 + (VectorNum × (IntCtl_VS || 0^5))
        endif
   endif
endif
CalcIntrptAddress = vectorBase | vectorOffset
endfunction CalcIntrptAddress
```

IX. Method

Figure 15:
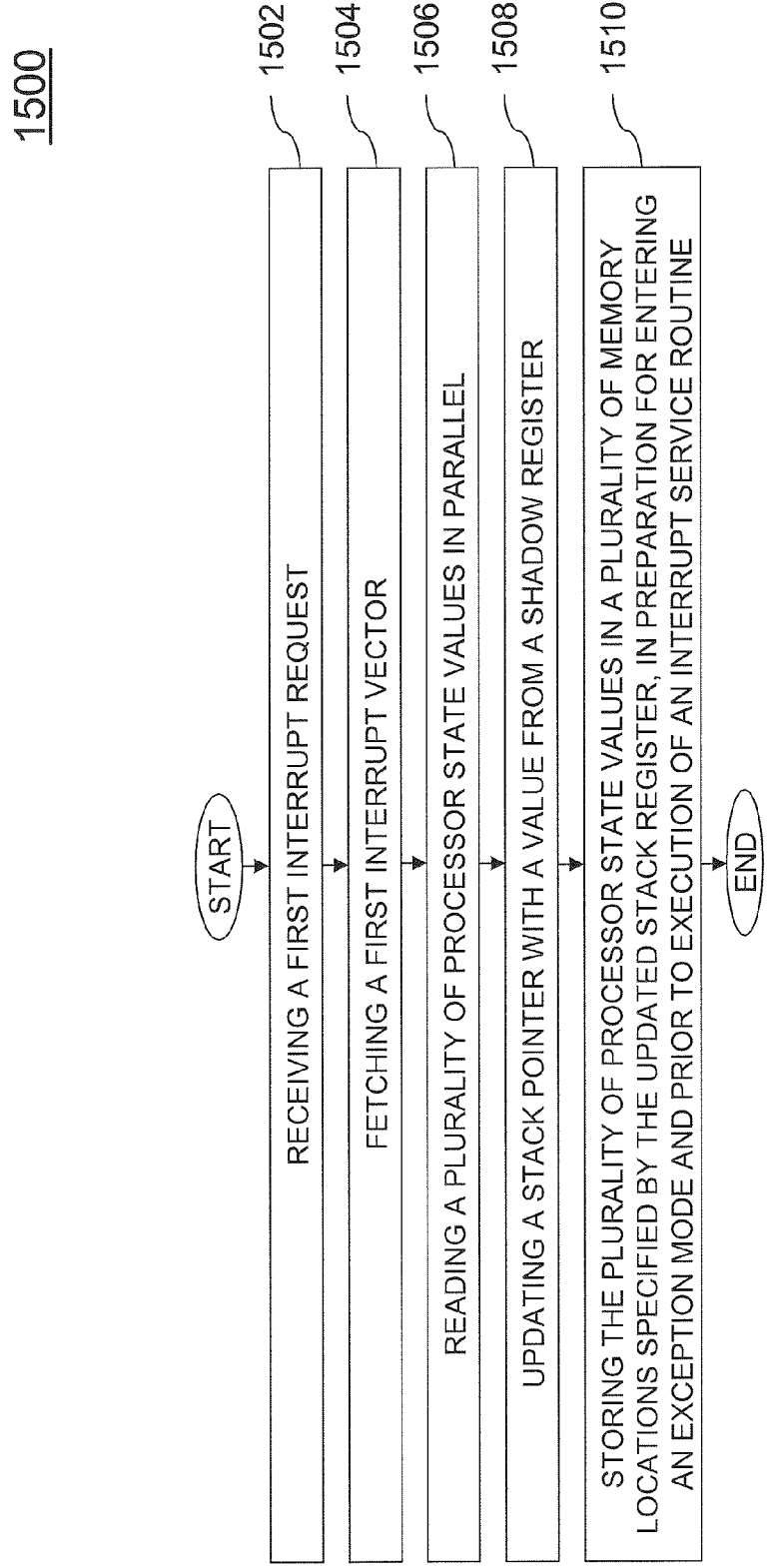
FIG. 15 is a flowchart of a method for automatic hardware interrupt handling, according to an embodiment of the present invention.

FIG. 15 illustrates method 1500 for automatic hardware interrupt handling, according to an embodiment of the present invention. In the example shown in FIG. 15, the method starts with step 1502 that includes receiving a first interrupt request. Step 1504 continues by fetching a first interrupt vector. Step 1506 contains a reading a plurality of processor state values in parallel. Step 1508 continues by updating a stack pointer with a value from a shadow register. Step 1510 concludes by storing the plurality of processor state values in a plurality of memory locations specified by the updated stack register, in preparation for entering an exception mode and prior to execution of an interrupt service routine.

X. Software Embodiments

For example, in addition to implementations using hardware (e.g., within or coupled to a Central Processing Unit ("CPU"), microprocessor, microcontroller, digital signal processor, processor, exception logic block, System on Chip ("SOC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known non-transitory computer readable storage medium including semiconductor, magnetic disk, optical disk (e.g., CD-ROM, DVD-ROM, etc.). In addition, such software can also be stored as a computer data signal embodied in a computer usable (e.g., readable) medium (e.g., any other medium including digital, optical, or analog-based medium). As such, the software can be transmitted over communication networks including the Internet and intranets.

It should be understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software.

XI. Conclusion

The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A processing system, comprising:
   a processor, comprising:
      an interrupt pin;
      a plurality of registers configured to store a plurality of processor state values;
      a stack pointer; and
      an automatic interrupt system configured to, upon detection of a first interrupt on the interrupt pin, and in preparation for entering an exception mode, cause:
         a first interrupt vector to be fetched,
         the stack pointer to be updated, and
         the plurality of processor state values to be read in parallel from the plurality of registers and stored to a plurality of memory locations specified by the updated stack pointer, prior to execution of an interrupt service routine, wherein the reading in parallel from the plurality of registers and the updating of the stack pointer are completed in a same single cycle.

2. The processing system of claim 1, further comprising:
   a speculative fetch system configured to speculatively fetch an interrupt vector.

3. The processing system of claim 1, wherein the automatic interrupt system, in preparing for returning to a non-exception mode, restores in parallel the plurality of processor state values stored in the memory locations specified by the updated stack pointer to the plurality of registers.

4. The processing system of claim 3, further comprising:
   an interrupt chaining system configured to process a second interrupt received prior to the restoration of the processor state values.

5. The processing system of claim 4, wherein the processing of the second interrupt does not flush a pipeline to return to a non-exception mode or flush the pipeline a second time to enter an exception mode.

6. A processing system, comprising:
   a processor comprising:
      an interrupt pin;
      a plurality of registers configured to store a plurality of processor state values;
      a stack pointer; and
      an automatic interrupt system configured to, upon detection, of a first interrupt on the interrupt pin, and in preparation for entering an exception mode, cause:
         a first interrupt vector to be fetched,
         the stack pointer to be updated, and
         the plurality of processor state values to be read in parallel from the plurality of registers and stored to a plurality of memory locations specified by the updated stack pointer, prior to execution of an interrupt service routine, wherein the reading in parallel from the plurality of registers and the updating of the stack pointer are completed in a same single cycle,
   wherein the processor state values includes a value in an EPC register, a value in a status register, and a value in a shadow register set control register.

7. A method of processor interrupt handling, comprising:
   receiving a first interrupt request;
   fetching a first interrupt vector;
   reading a plurality of processor state values in parallel;
   updating a stack pointer with a value from a shadow register; and
   storing the plurality of processor state values in a plurality of memory locations specified by the updated stack pointer, in preparation for entering an exception mode and prior to execution of an interrupt service routine, wherein the reading of processor state values in parallel and the updating of the stack pointer are completed in a same single cycle.

8. The method of claim 7, wherein the fetching of the first interrupt vector is done speculatively.

9. The method of claim 7, wherein the processor state values include a value in an EPC register, a value in a status register, and a value in a shadow register set control register.

10. The method of claim 7, further comprising restoring in parallel, in preparing for returning to a non-exception mode, the plurality of processor state values stored in the memory locations specified by the updated stack pointer.

11. The method of claim of claim 10, further comprising:
    processing a second interrupt received prior to the restoration of the processor state values.

12. The method of claim 11, wherein the processing of the second interrupt does not comprise flushing a pipeline to return to a non-exception mode or a flushing of the pipeline a second time to enter an exception mode.

13. A non-transitory computer readable storage medium having embodied thereon computer readable program code for generating a processor, the computer readable program code comprising:
    computer-readable code to generate a plurality of registers configured to store a plurality of processor state values;
    computer-readable code to generate a stack pointer; and
    computer-readable code to generate an automatic interrupt system configured to, detect a first interrupt on an interrupt pin,
    wherein a first interrupt vector is fetched,
    wherein the stack pointer is updated, and
    wherein the plurality of processor state values is read in parallel from the plurality of registers and stored to a plurality of memory locations specified by the updated stack pointer, prior to execution of an interrupt service routine, wherein the reading in parallel from the plurality of registers and the updating, of the stack pointer is completed in a same single cycle.

14. The non-transitory computer readable storage medium of claim 13, further comprising:
    computer-readable code to generate a speculative fetch system configured to speculatively fetch an interrupt vector.

15. The non-transitory computer readable storage medium of claim 13, wherein the processor state values includes a value in an EPC register, a value in a status register, and a value in a shadow register set control register.

16. The non-transitory computer readable storage medium of claim 13, wherein the automatic interrupt system, in preparing for returning to a non-exception mode, restores in parallel the plurality of processor state values stored in the memory locations specified by the updated stack pointer to the plurality of registers.

17. The non-transitory computer readable storage medium of claim 16, further comprising:
   computer-readable code to generate an interrupt chaining system configured to process a second interrupt received prior to the restoration of the processor state values.

18. The non-transitory computer readable storage medium of claim 17, wherein the processing of the second interrupt does not comprise flushing a pipeline to return to a non-exception mode or flushing the pipeline a second time to enter an exception mode.

* * * * *